(12) United States Patent
Henry et al.

(10) Patent No.: US 6,681,392 B1
(45) Date of Patent: Jan. 20, 2004

(54) METHOD AND APPARATUS FOR REMOTE PERIPHERAL SOFTWARE INSTALLATION

(75) Inventors: Clarence Terrance Henry, Lexington, KY (US); Lauren Elizabeth Logan, Lexington, KY (US); David Nolan Mattingly, Lexington, KY (US); Suzanne Marie Thompson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/464,272

(22) Filed: Dec. 15, 1999

(51) Int. Cl.[7] .......................... G06F 9/445; G06F 9/44; G06F 13/10; G06F 9/00; H04N 1/00

(52) U.S. Cl. ..................... 717/176; 717/171; 709/321; 709/327; 358/305

(58) Field of Search ................. 717/176, 168–175, 717/177–178; 709/217, 220–223, 226, 229, 245–246, 321, 327; 707/1, 10, 104.1, 200, 203–205; 358/409, 413, 437, 305, 1.14, 1.15; 710/8, 15, 20, 54

(56) References Cited

U.S. PATENT DOCUMENTS

| | | | |
|---|---|---|---|
| 5,228,118 A | | 7/1993 | Sasaki .................... 358/1.13 |
| 5,371,837 A | | 12/1994 | Kimber et al. ............. 358/1.15 |
| 5,428,748 A | | 6/1995 | Davidson et al. ............ 710/9 |
| 5,467,434 A | | 11/1995 | Hower, Jr. et al. ........ 358/1.15 |
| 5,564,109 A | | 10/1996 | Snyder et al. ............. 710/8 |
| 5,579,529 A | | 11/1996 | Terrell et al. ............ 710/8 |
| 5,580,177 A | | 12/1996 | Gase et al. .............. 400/61 |
| 5,611,046 A | | 3/1997 | Russell et al. ............ 358/1.16 |
| 5,655,148 A | * | 8/1997 | Richman et al. ............ 710/8 |
| 5,659,670 A | | 8/1997 | AuClair .................. 358/1.16 |
| 5,666,501 A | * | 9/1997 | Jones et al. .................. 345/748 |
| 5,684,952 A | * | 11/1997 | Stein ........................ 709/221 |
| 5,687,301 A | | 11/1997 | Stokes et al. ............... 358/1.13 |
| 5,692,111 A | * | 11/1997 | Marbry et al. ............. 358/1.15 |
| 5,694,529 A | | 12/1997 | Fromherz .................. 358/1.15 |
| 5,699,495 A | | 12/1997 | Snipp ...................... 358/1.15 |
| 5,754,747 A | | 5/1998 | Reilly et al. ............... 358/1.15 |
| 5,761,380 A | * | 6/1998 | Lewis et al. ................ 706/47 |
| 5,768,583 A | | 6/1998 | Orzol et al. ............... 713/1 |
| 5,778,368 A | * | 7/1998 | Hogan et al. ............... 707/10 |
| 5,787,237 A | | 7/1998 | Reilly ..................... 358/1.13 |
| 5,826,103 A | * | 10/1998 | Whittaker ................. 710/8 |
| 5,832,191 A | | 11/1998 | Thorne .................... 358/1.15 |
| 5,852,744 A | | 12/1998 | Agatone et al. ............ 710/17 |
| 5,933,584 A | * | 8/1999 | Maniwa ................... 358/1.15 |
| 6,020,971 A | * | 2/2000 | Kato et al. ............... 358/1.14 |
| 6,065,074 A | * | 5/2000 | Minamizawa .............. 710/54 |
| 6,067,582 A | * | 5/2000 | Smith et al. .............. 710/5 |
| 6,081,508 A | * | 6/2000 | West et al. ............... 370/238 |
| 6,400,462 B1 | * | 6/2002 | Hille ..................... 358/1.14 |
| 6,418,555 B2 | * | 7/2002 | Mohammed ............... 717/169 |
| 6,442,565 B1 | * | 8/2002 | Tyra et al. ................ 707/102 |

* cited by examiner

*Primary Examiner*—Antony Nguyen-Ba
(74) *Attorney, Agent, or Firm*—Stephen B. Phillips

(57) ABSTRACT

Method and apparatus for remote peripheral software installation. A software system running in a local computer system used by a system administrator can install drivers, network utilities, and other peripheral software on a remote system connected to a network. The software system gathers system information from the remote system including the locations and names of system files. The software system also provides for the stopping and restarting of services which are associated with the peripheral software. In this way, installation can be completed without rebooting, or otherwise disrupting the operation of the remote system. Additionally, no special software is needed on the remote system, and no user need be logged into the remote system.

15 Claims, 9 Drawing Sheets

Custom Setup

Where do you want to install the software?

○ Local Computer
Install software on the computer you are currently using.

◉ Remote Computer
Install software on a computer over the network.
Not all software can be installed remotely.

[< Back] [Next >] [Cancel]

Custom Setup

Select the components you want to install, clear the components you do not want to install.

Components
☒ Printer Drivers
☒ Network Support

Description
This option installs Network Support for printer drivers and MarkVision in Windows NT.

< Back | Next > | Cancel

METHOD AND APPARATUS FOR REMOTE PERIPHERAL SOFTWARE INSTALLATION

BACKGROUND OF THE INVENTION

1. Field of the Invention

This invention is related to the installation of peripheral software, such as drivers and control programs, on networked computers and workstations. More particularly, this invention is related to the remote installation of such software. That is, the installation of such software on a specific machine on a network under the control of a different machine on the same network. This type of installation facilitates the management of peripherals and their software throughout a network by system administrators or similar personnel.

2. Description of the Problem Solved

The proliferation of personal computers and desktop workstations during the later part of the 20$^{th}$ Century has had a dramatic impact on the workplace. Many businesses rely heavily on large numbers of personal computer systems that are used on a day-to-day basis by their employees. In most businesses with many systems, a network interconnects all the systems. This network may be a local area network (LAN), a wide area network (WAN), a metropolitan area network (MAN), or any other type of network capable of interconnecting personal computers. The increased use of networks to interconnect computing systems allows data to be shared readily and therefore has increased efficiencies in doing business. However, the increased use of networks has caused a new set of problems in the administration of those networks.

Managing all of the software and hardware connected to a large network can be a daunting task. Usually this task falls to systems administrators or similar personnel. A key responsibility of managing such a network is the managing of all of the interconnected peripheral devices that are used on the network. This managing of the peripheral devices includes installing and updating driver software and other control software required by the peripheral devices. Numerous ideas have been proposed to make this job easier. For example, U.S. Pat. No. 5,580,177, issued Dec. 3, 1996, to Gase, et al., entitled "Printer/Client Network with Centrally Updated Printer Drivers and Printer Status Monitoring" proposes a special procedure installed on client workstations, which enables the client processor to interface with at least one printer type. If the client processor needs to print via printer which does not work with the stored driver the driver can be updated, from a server, with a utility, under the control of a client user. This patent is incorporated herein by reference.

Several software products on the market allow a system administrator to remotely access a networked computer, controlling the networked computer through keyboard and mouse commands as if the system administrator was actually sitting at the remote networked computer. An example of such a product is Timbuktu™, published by Netopia, Inc. Using such software, it is possible for an administrator to execute a software installation program and install peripheral software as if he or she was doing it on a local machine.

There are a number of problems with the above approaches. First, they require special software to be running in the client computer system, solely for the purpose of remote access or installation of peripheral software. If a remote computer system is running an operating system that requires user login, a user must be logged into the system before peripheral software can be updated. Finally, the installation of peripheral software such as drivers often disrupts processing on the system so that the system must be rebooted afterwards, meaning that a system administrator or user must be physically present at the remote machine to restart it after installation. What is needed is an improved method of remotely installing peripheral software such as drivers and utilities on a system over a network. Ideally, such a method should not require any special remote access applications to be running or even present on the remote system. The method should also allow the installation of peripheral software without rebooting or otherwise disrupting the remote system's operation, and should not require that a user be logged into the remote system.

SUMMARY OF THE INVENTION

The present invention meets the above needs by providing software that allows administrators to push drivers and network utilities down to other systems. No special remote access software needs to be running on the remote system, which is the subject of an install. Furthermore, a user need not be logged in to the remote system to allow remote access. The invention, rather, makes use of administrator login capabilities currently available on Windows NT™. Such capabilities are also expected to be available on Windows™ 2000. Other operating systems also have similar capabilities. Additionally, the invention provides a way to stop and start related services on the remote system so that a reboot is not required.

The invention provides the above capabilities through software which runs on a system administrator's workstation connected to a network. The software remotely installs peripheral software on a remote system, which is connected to the same network. In executing the method of the invention, system information for the remote system is first resolved by interacting with the remote system over the network. Such system information most often includes locations of files and directories that are related to the peripheral software. This information can be obtained from the registry of the remote system. The system information also often includes peripheral objects and ports which are currently in use, or available on the remote system. According to the invention, a determination is then made as to which software and options have been selected for installation on the remote system. Related services on the remote system are stopped. The appropriate peripheral software is then copied to the remote system over the network and related services are restarted. System information for the remote system is then updated. The above method can be used with any type of peripheral software including printer drivers, network utilities, and all other types of drivers and utilities. If the peripheral software is or includes a printer driver, the related services usually include the running of a print spooler.

The invention is implemented by a software system that includes an installation graphical user interface (GUI). An install engine is connected to the installation GUI, and receives a list of software from the installation GUI. The install engine also controls the operation of the network administrator's system. A driver installation subsystem is connected to the install engine for creating and customizing the peripheral software according to the list of software. A file copy subsystem for receiving a file copy list and displaying copy progress is connected to the install engine. An enumeration subsystem is connected to the installation GUI. Finally, a remote system information subsystem for retrieving system information from the remote system is connected to the system information subsystem and the file copy subsystem. If the software of the present invention is implemented for installing printer drivers, a subsystem for starting and stopping a print spooler is also included.

The software, which implements many aspects of the present invention, can be stored on a media. The media can be magnetic such as diskette, tape, or fixed disc, or optical, such as a CD-ROM. Additionally, the software can be supplied via the Internet or some other type of network. A workstation that typically runs the software includes a plurality of input/output evices, a connection for the network, and a system unit that includes both hardware and software necessary to implement the invention. The workstation that implements the present invention, as well as the remote computer system on which peripheral software is installed, both operate in a network, such as a LAN, which includes multiple computer systems and peripheral devices.

BRIEF DESCRIPTION OF THE DRAWINGS

FIG. 3 shows another display screen that may be encountered when making use of the present invention on a computer system.

FIG. 5 illustrates still another display screen that may be encountered when making use of the present invention.

DETAILED DESCRIPTION OF THE INVENTION

The following terminology is used through this disclosure. When we say "local computer system" we mean the computer system which is executing the software of the invention. Typically, this will be a computer system, which is operated by a system administrator, or network engineer who must maintain drivers and utilities on many workstations or personal computers throughout a network. When we say "remote system" or "remote computer system" we mean the system which is being updated by the system administrator or network engineer. When we say "peripheral software" we mean any software, such as drivers or utilities, which enables a peripheral device or network connection to operate with a specific computer system. In the case of a specific peripheral device, the device may be locally attached to the remote system or it may be a network peripheral. In most modem operating systems whether a peripheral is local or networked is transparent to a user once the appropriate driver software is installed. In the case of a local peripheral the computer system communicates with the peripheral over a direct cable attachment such as a RS-232 interface. In the case of a network peripheral, a computer system communicates with such a peripheral via the network.

Figure 1:
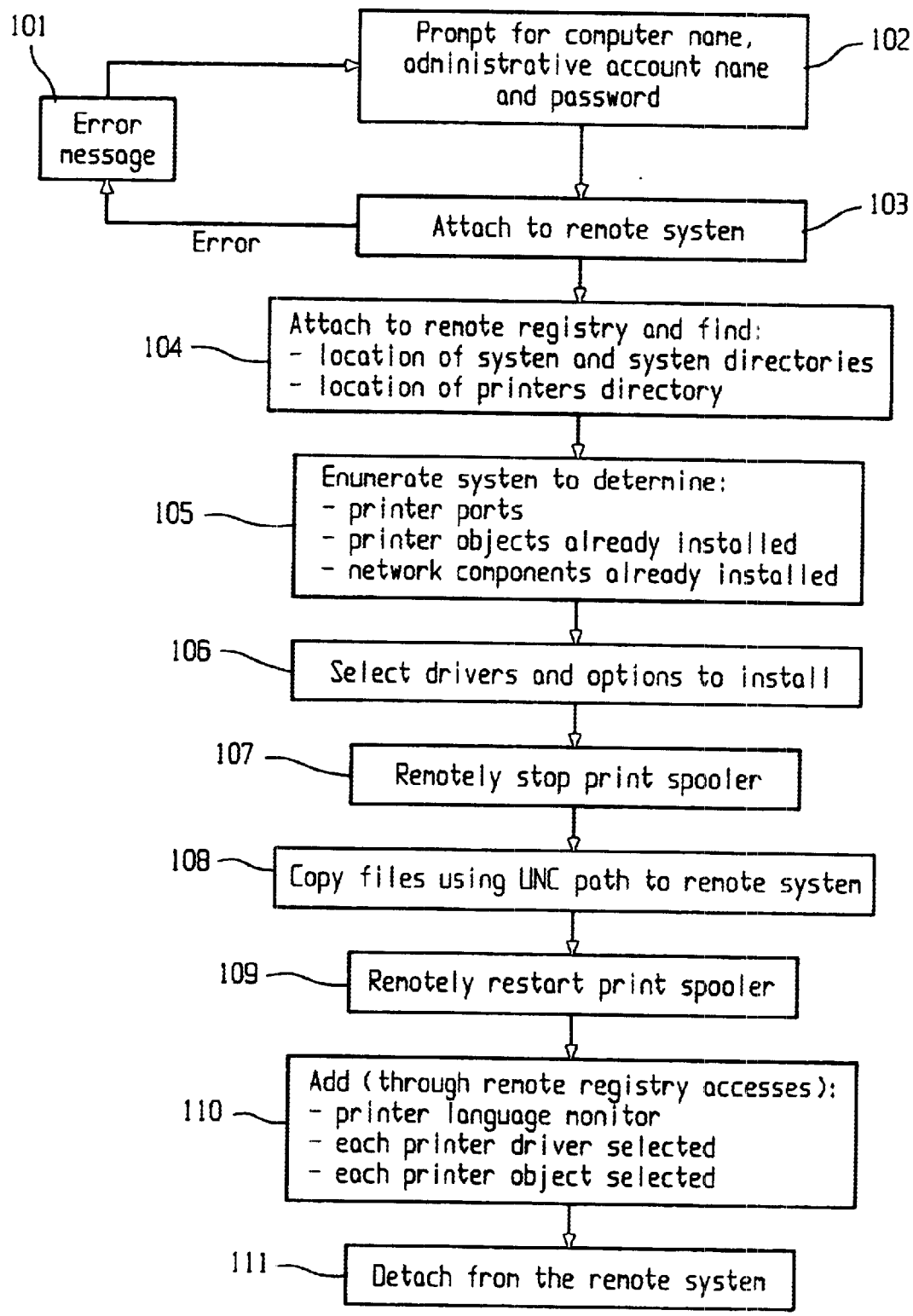
FIG. 1 is a flowchart that illustrates the method executed by the software of the present invention.
Figure 2:
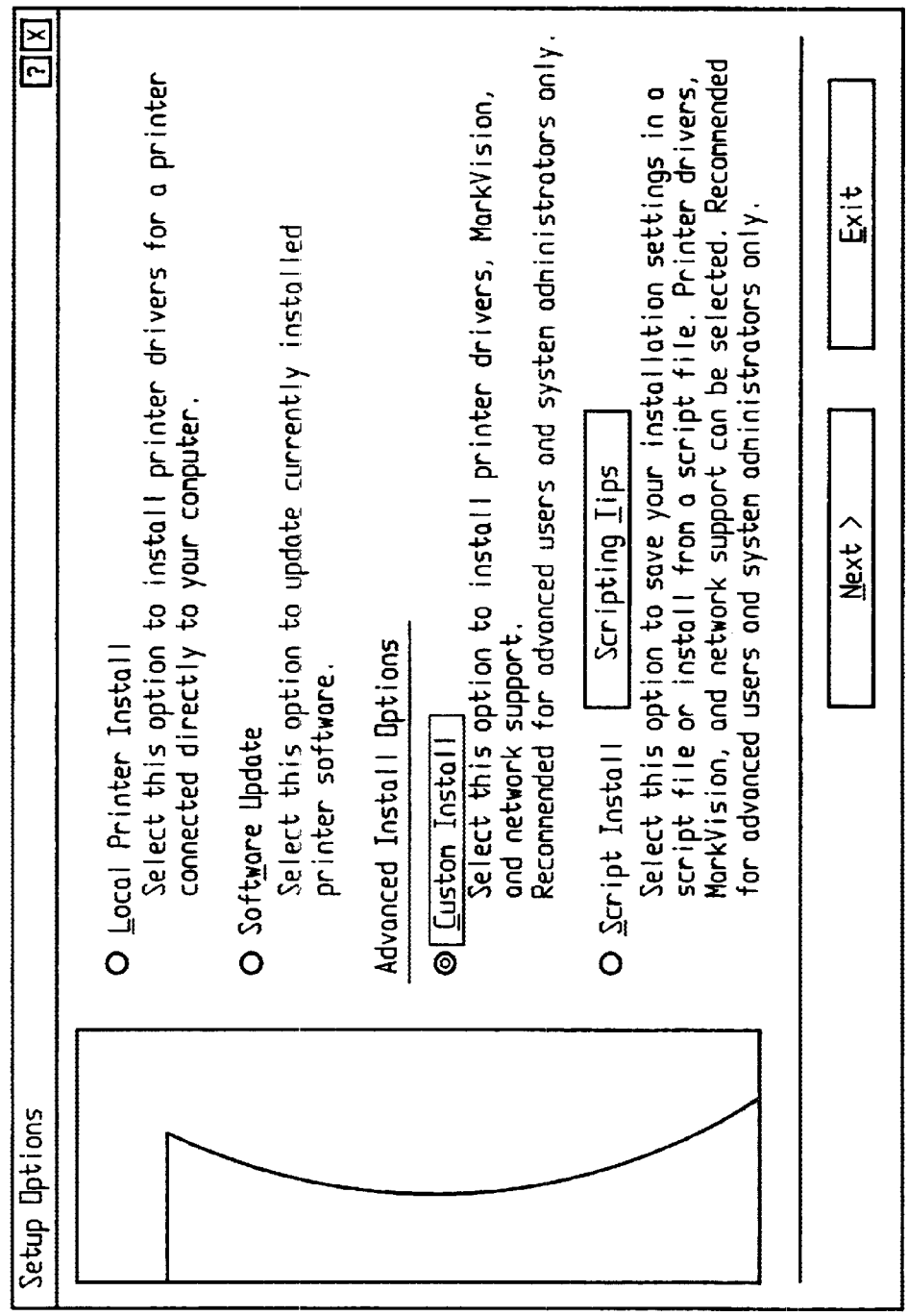
FIG. 2 shows an example display screen that may be encountered when using the present invention on a computer system.
Figure 4:
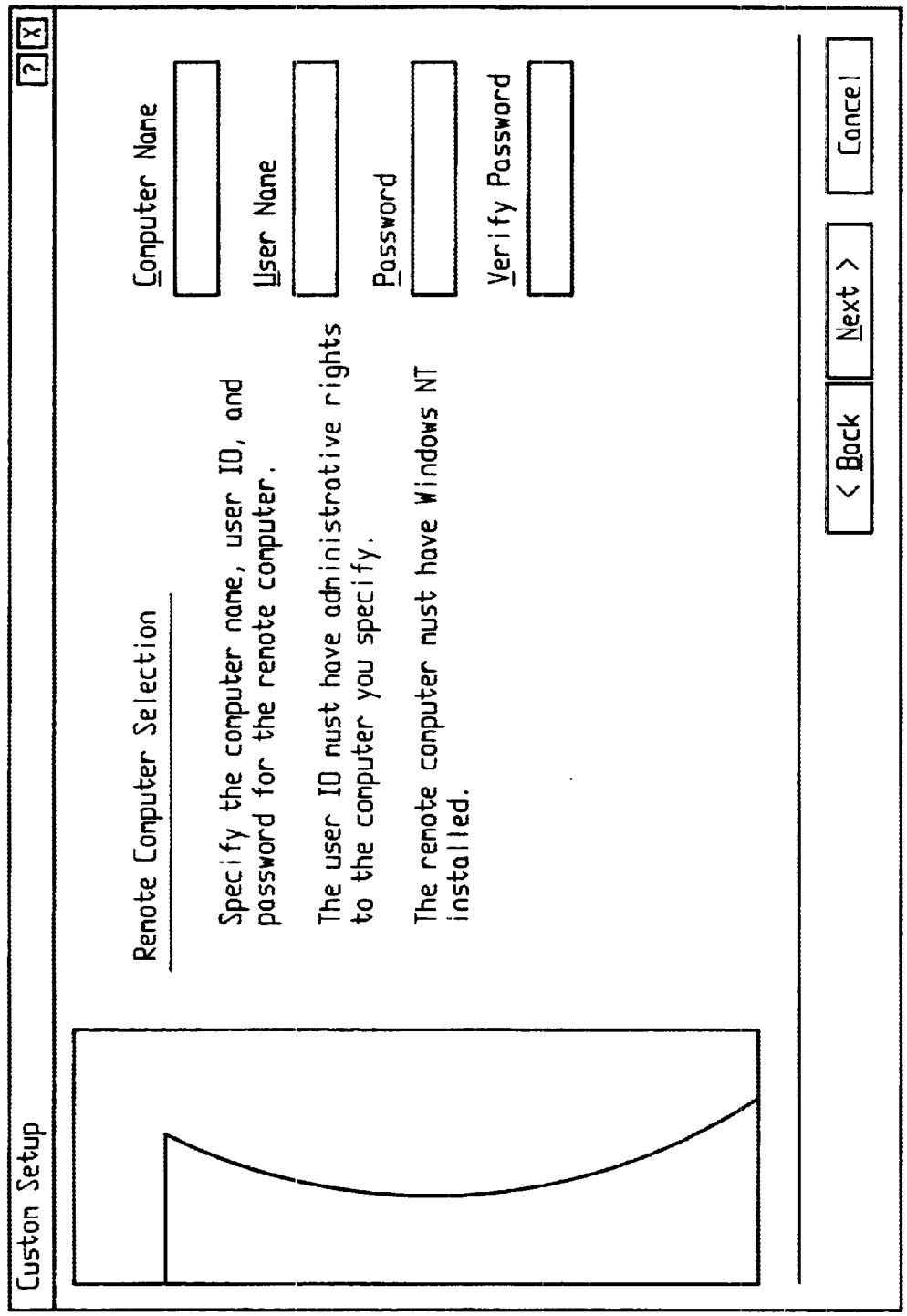
FIG. 4 shows yet another display screen that may be encountered when making use of the present invention.

FIG. 1 illustrates the method of the invention. FIGS. 2, 3, 4, 5, and 6 illustrate display screens that are encountered by a user of the invention. In FIG. 2, a user decides to install software on a remote computer by selecting the appropriate radio button. In this case, the invention is implemented by selecting one of the advanced install options. For purposes of the discussion, which immediately follows, the "Custom Install" button is selected. The script install button will be discussed later. In FIG. 3, the user chooses to install peripheral software on a remote computer system. This selection initiates the process shown in FIG. 1. At 102 of FIG. 1, a user is prompted for a computer name, an account name, and a password. FIG. 3 illustrates a display screen, which is presented as part of this process. At 103 of FIG. 1 the software of the present invention attaches to the remote system. If for some reason this is not possible, an error is reported at 101. In steps 104 and 105 of FIG. 1, system information for the remote system is resolved by interacting with the remote system over the network.

In most cases, this resolving of system information includes two steps. First the local computer system attaches to the remote registry. The remote registry contains a wealth of information about the remote system. This information includes the location of system files and system directories, files that are associated with the type of peripheral being contemplated, and other critical system information. Secondly, the remote system is enumerated to determine peripheral objects and ports already installed and what utilities and drivers are already installed. If the peripheral software includes a printer driver this information includes printer ports and printer objects already installed. If the peripheral device is a network peripheral, the information may also include network utilities already installed. If necessary, these network utilities are updated automatically to be at a compatible revision level. The system information is needed to find the correct directories to install files that are associated with the peripheral software. The registry contains keys that point to items such as root directories and spool directories. By obtaining this information, the local system is able to determine locations for system and driver files that are related to the peripheral for which the software is being installed or updated.

Figure 6:
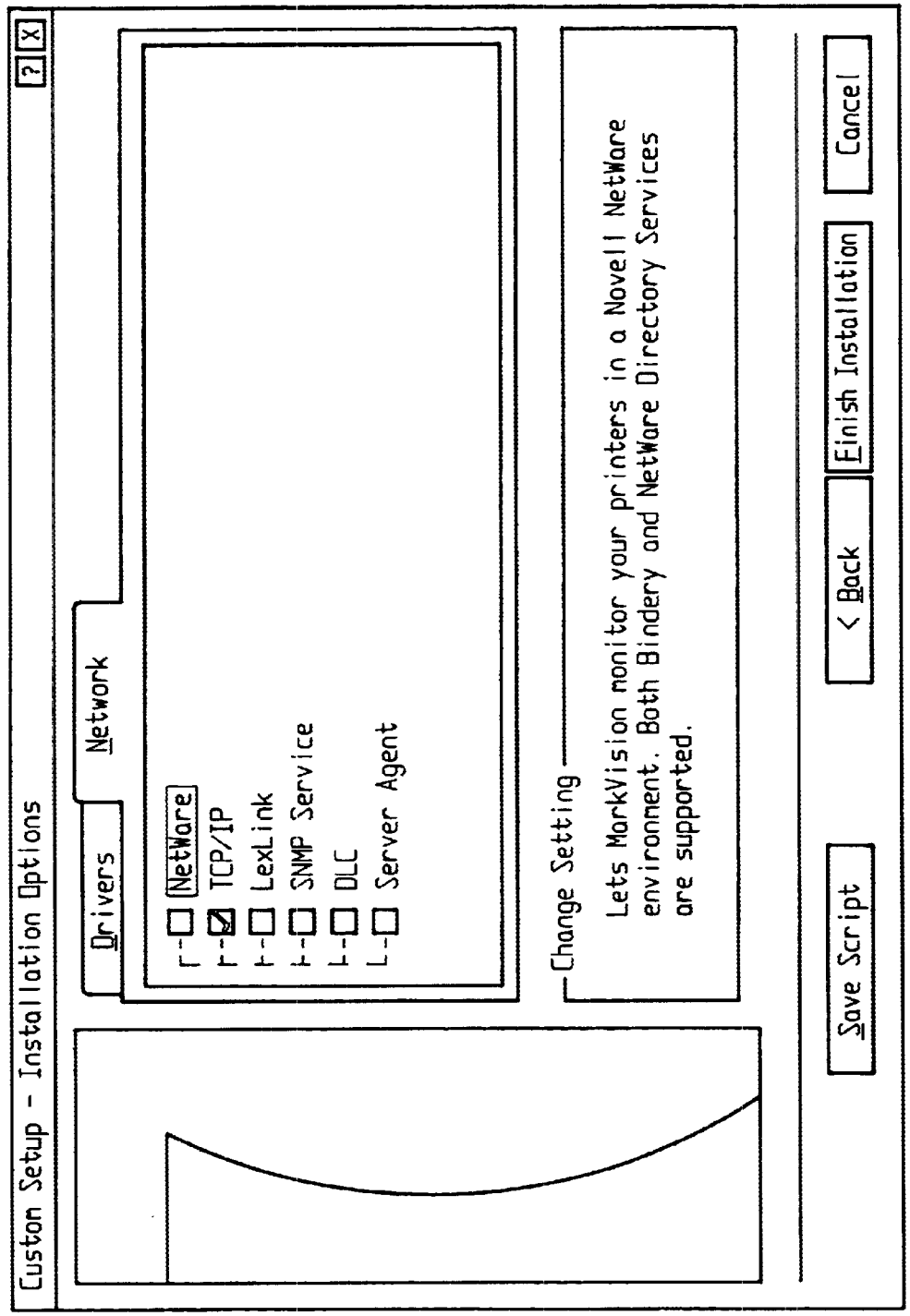
FIG. 6 illustrates another display screen that may be encountered when making use of the present invention.

At step 106 of FIG. 1, software and options for installation on the remote system are determined. In this example, a network printer is the peripheral for which software is being installed, so the software includes printer drivers and network utilities. Either or both of these types of software may be installed according to certain installation options. FIGS. 5 and 6 illustrate display screens that include check boxes where a user can select, in the case of FIG. 5, whether to install printer drivers, network support, or both. In the case of FIG. 6, a user selects specific network utilities.

It should be noted that there are two ways that a determination of software and options can be made. The user can directly select such options through a user interface, such as illustrated in FIGS. 2 through 6. Alternatively, a user can select these options once and save them as a script. Note the "save script" button in FIG. 6. Generally, a script is a name for a macro or batch file containing a list of commands that can be executed without user interaction. In this case, a script is a list of instructions to automatically install software with specific selections. Such a method of determining options is useful if a network administrator must install the same software, drivers, and utilities with the same options on a large number of remote computer systems. In the display screen shown in FIG. 2, buttons are provided to choose a script install and to select a script at the beginning of an installation routine. It is even possible to create a script that installs peripheral software on many computers simultaneously without user intervention.

At 107 of FIG. 1, related services on the remote system are stopped. In this particular case, the only related service is a print spooler. Stopping such processing allows the software to replace existing component files that are related to the peripheral software being installed or updated. In the case of a printer driver, if the spooler were not stopped, the remote system might require a reboot to print correctly. Reboots are generally required in driver installs to replace files that are locked at the time of install or to initialize some service or component. By stopping processing during the file copy process and then restarting it later, system restarts can be eliminated.

At Step 108 in FIG. 1, necessary files are copied to the remote system over the network. Each networked operating system has its own protocols for performing this copy. In many operating systems, a universal naming convention (UNC) is used. The UNC allows for accessing shared network resources as if they were available on the local system. Operating systems with UNC support include all the Windows operating systems, IBM's OS/2™, and Unix. In such an operating system, a file is specified by a character string, which includes a server name, a share name, a path, and a file name, separated by backslashes. In this way files on a remote system can be accessed as if they are local files. At step 109, related services on the remote system are restarted by interacting with the remote system over the network. In this case the print spooler is restarted. At step 110 system information of the remote system is updated. This step includes updating the registry of the remote system, necessary to ensure proper operation of the remote system once the process is complete. In the case of printer drivers, this update would include adding a printer language monitor, references to the printer drivers selected, and references to the printer objects added. The setting of flags in the registry, signaling the appropriate installation options, is also required. At step 111, the local computer system that is carrying out the install detaches from the remote system.

It is important to note that during the entire process illustrated in FIG. 1, no executables are run on the remote system. There is no need for a service or any other program to be installed or running on the remote system in order to perform the remote install. Standard operating system function calls are used to access the information needed from the remote system. It is necessary, however, to communicate to the driver being initialized on the remote system, that the install is a remote install. Certain drivers perform initialization routines, such as inkjet head alignment, that require user intervention during the install process. For a remote install, such processes need to be suppressed. The install program sets values in the remote registry signaling to the driver that the install is a remote install and that any initialization requiring user intervention must be suppressed.

In the installation user interface, a port selection list for each driver object must include a list of ports on the remote system, not the local system. The enumeration of the remote system produces this port list. The enumeration also produces a list of installed printer objects on the remote system to ensure that the installation process does not create a duplicate name. It may also be necessary to carefully manage the suspension of related services so that data is not lost. In the case of a print spooler, the software of the present invention waits until any job currently being printed is finished. Any jobs in the print queue, but not printing, are paused until the printer software installation is complete, and then restarted.

Figure 7:
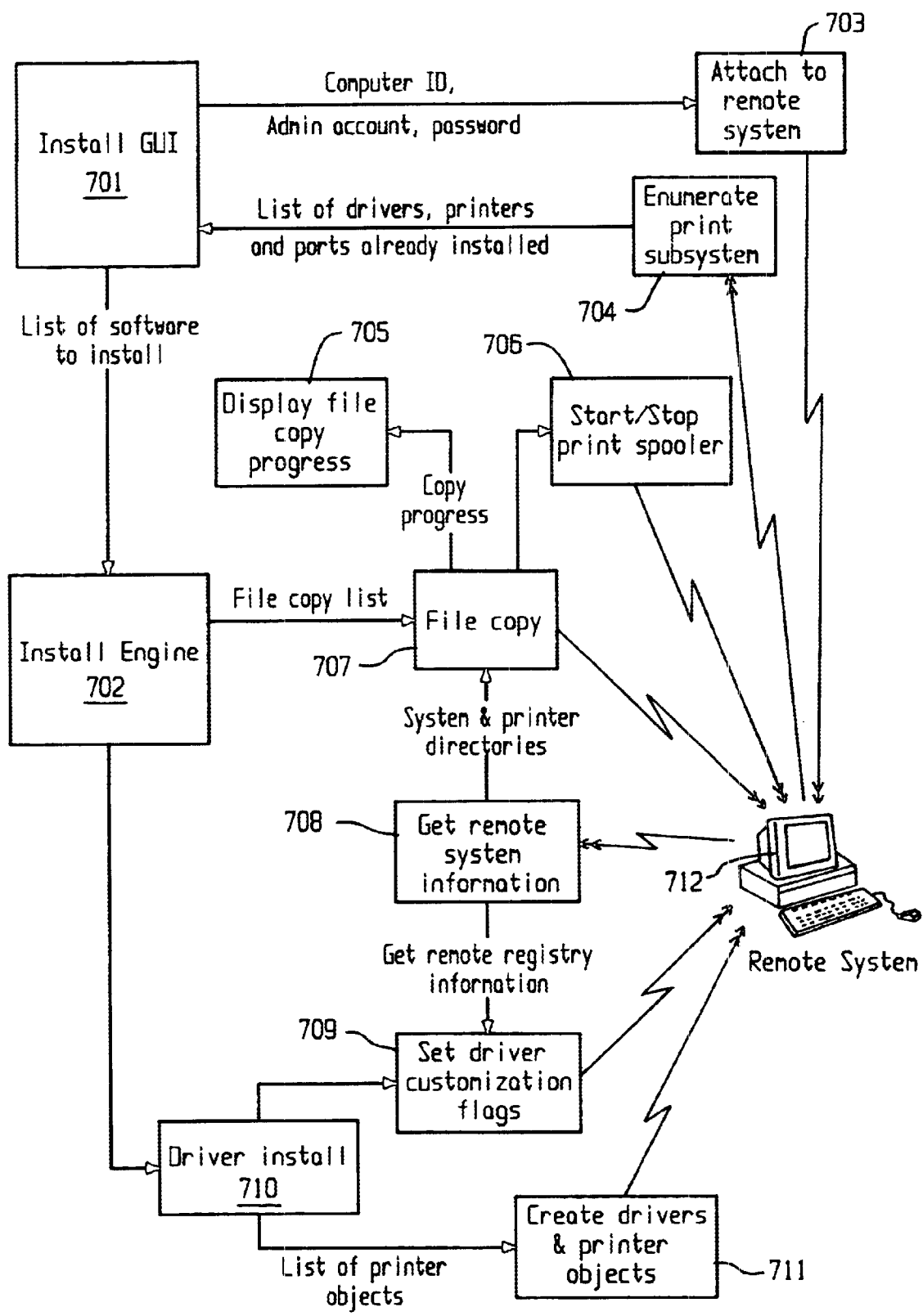
FIG. 7 is a software block diagram that illustrates the various software components of the present invention and shows how they interact.

FIG. 7 is a software block diagram illustrating the various software subsystems and modules, which interact to enable the invention. Installation graphical user interface (GUI) 701 and install engine 702 are the key components which control the operation of the system and present and retrieve information. Installation GUI 701 passes account information to the remote system through an attachment subsystem 703. A list of drivers and ports already installed is retrieved through the enumeration subsystem 704. A file copy subsystem includes module 705, which displays the file copy progress, module 706, which starts and stops the print spooler and module 707, which copies files. Module 708 is the remote system information subsystem, which gets the remote system information from remote system 712. Modules 709, 710, and 711 form the driver installation subsystem that is connected to the install engine for creating and customizing the peripheral software according to the appropriate list. Module 709 sets driver customization flags. Module 711 creates the drivers and printer objects on remote system 712. Driver installation module 710 controls this operation, and passes a list of printer objects to module 711. The remote system information subsystem 708 passes system and printer directories to the file copy subsystem and registry information to the driver installation subsystem. The file copy subsystem retrieves a file copy list from install engine 702. Install engine 702 retrieves a list of software to install from installation GUI 701 during the installation process for determining which software is to be part of the installation and which options are to be applied. As previously discussed, this determination can be made by direct user input, or by executing a script file.

Figure 8:
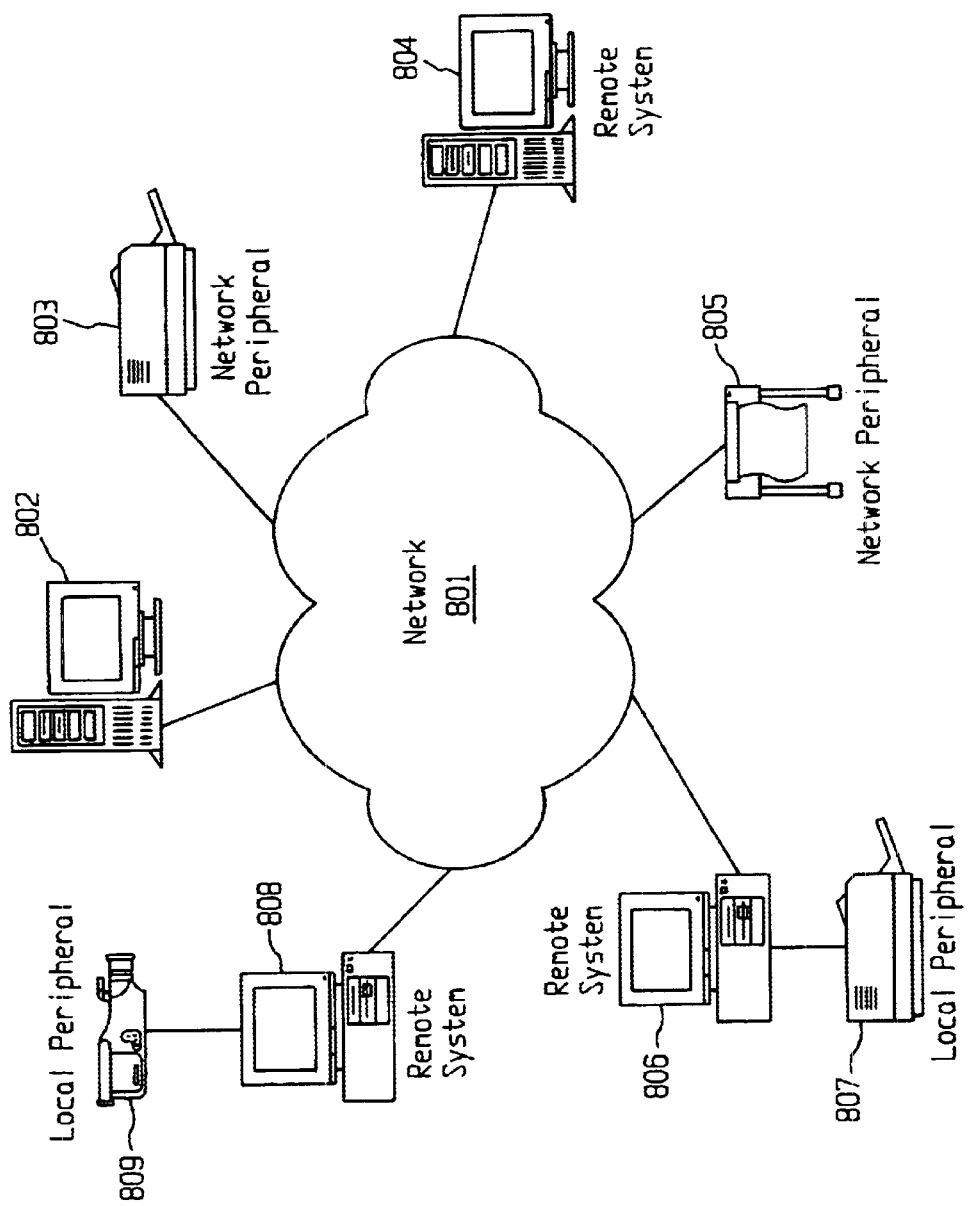
FIG. 8 illustrates the network operating environment according to the present invention.

FIG. 8 illustrates the network operating environment of the present invention. The invention operates completely independently of the type of network architecture used. Therefore, network 801 can be any type of network, including a LAN, or a wide area network (WAN). Networked devices in FIG. 8 include workstation 802, workstation 804, workstation 806, and workstation 808. Additionally, printer 803 and plotter 805 are networked peripherals. Workstation 808 includes a local peripheral, camera 809, used for digital imaging or video conferencing. Workstation 806 includes a local printer 807. Workstation 802 is used by a system administrator to update and maintain peripheral software on all of the other systems. The invention operates at workstation 802. Using the invention, a system administrator can install drivers and network utilities on remote system 804 to allow it to make use of network peripheral 803, a printer, and network peripheral 805, the plotter. The system administrator can also use the invention at 802 to install peripheral software on remote system 808 for local peripheral 809, the camera. The system administrator can also install peripheral software on remote system 806 for local peripheral 807, a printer. In case of remote systems 806 and 808, the system administrator using workstation 802 can install software and options for both the local peripherals, and remote peripherals 803 and 805. Using the invention, peripheral software can be installed without a user even being logged in to remote systems 804, 806, and 808. Because the software of the invention is capable of stopping and starting services associated with the peripheral software, none of the systems will have to be rebooted. Additionally, no special software is required on any of the remote systems. The remote systems simply run the selected native operating system, as well as any normal applications that users desire.

Figure 9:
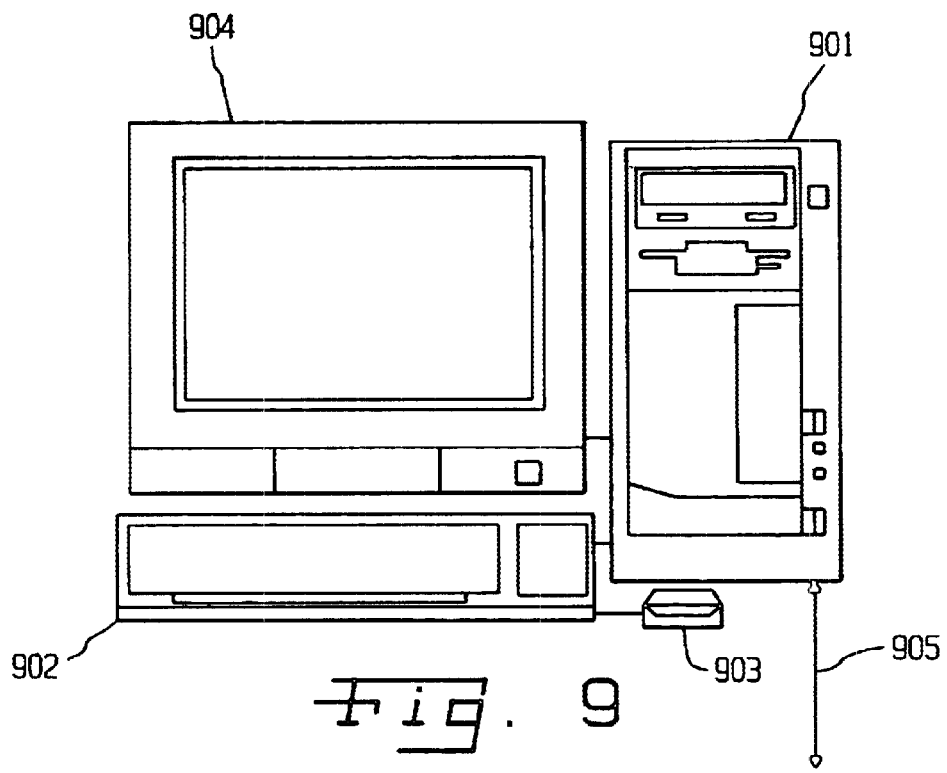
FIG. 9 illustrates a workstation on which the present invention is implemented.

FIG. 9 illustrates a workstation on which the software of the present invention can be operated. Input/output (I/O) devices such as keyboard 902, mouse 903 and display 904 are used by an operator to provide input and view information related to the operation of the invention. System unit 901 is connected to all of the I/O devices and contains memory, media devices, and a central processing unit (CPU), all of which together execute the software of the present invention. These devices in combination with the software are the means for carrying out the various steps involved in implementing the invention. A network interface is normally implemented via an adapter card or a combination of adapter cards. For the sake of simplicity, the network interface is shown graphically as interface 905.

Figure 10:
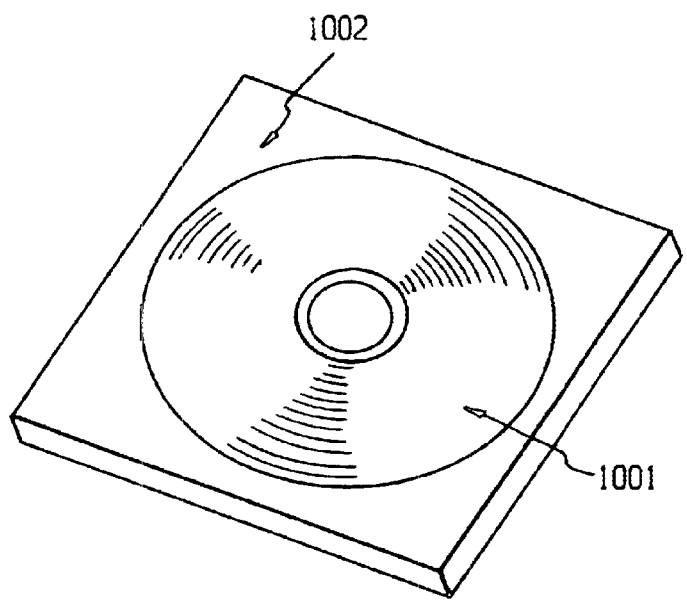
FIG. 10 illustrates a media on which computer program code that implements the present invention may be stored.

As previously mentioned, appropriate computer program code in combination with the appropriate hardware implements the invention. This computer program code is often stored on storage media. This media can be a diskette, hard disk, CD-ROM, DVD-ROM, or tape. The media can also be a memory storage device or collection of memory storage devices such a read-only memory (ROM) or random access memory (RAM). Additionally, the computer program code can be transferred to a workstation over the Internet or some other type of network. FIG. 10 illustrates one example of a media. FIG. 10 shows an optical disc 1001 commonly known as a CD-ROM. The CD-ROM usually consists of a metallic substrate encased in plastic. Such a media is typically transported and stored in a "jewel box" 1002 which is not considered to be a part of the media. Indentations in the aluminum substrate of the CD-ROM are used to encode the computer program code. These indentations can then be scanned by a laser in order to retrieve the program code and load the code into a computer system.

We have described specific embodiments of our invention, which provides a way to remotely install peripheral software over a network. One of ordinary skill in the networking and computing arts will quickly recognize that the invention has other embodiments. In fact, many implementations are possible. The following claims are in no way intended to limit the scope of the invention to the specific embodiments described.

We claim:

1. At a local computer system on a network, a method of installing peripheral software in response to a user selection to install the peripheral software on a remote system which is connected to the network, the method comprising the steps of:

resolving system information for the remote system by interacting with the remote system over the network, wherein the system information comprises peripheral objects and ports installed on the remote system;

determining software and option selection for installation on the remote system;

stopping, by interacting with the remote system over the network, one or more related services on the remote system to allow replacement of existing component files of the peripheral software, at least in part in response to the user selection to install the peripheral software, said stopping step not requiring a subsequent reboot of the remote system;

copying the peripheral software to the remote system over the network;

restarting the one or more related services on th e remote system by interacting with the remote system over the network; and updating system information on the remote system by interacting with the remote system over the network.

2. The method of claim 1 wherein the resolving step further comprises the steps of:

attaching to the registry of the remote system to find a location on the remote system of one or more files which are related to the peripheral software; and enumerating the remote system to determine one or more peripheral objects and one or more ports on the remote system.

3. The method of claim 2 wherein the step of copying the peripheral software to the remote system over the network further comprises the step of copying a printer driver and one or more network utilities, and wherein the steps of stopping and restarting the one or more related services further include the steps of stopping and restarting a print spooler.

4. The method of claim 1 wherein the step of copying the peripheral software to the remote system over the network further comprises the step of copying a printer driver and one or more network utilities, and wherein the steps of stopping and restarting the one or more related services further include the steps of stopping and restarting a print spooler.

5. A computer program product for use in a computer system on a network, the computer program product for remotely installing peripheral software in response to a user selection to install the peripheral software on a remote system which is connected to the network, the computer program product including a media with a computer program embodied thereon, the computer program comprising:

computer program code for resolving system information for the remote system by interacting with the remote system over the network, wherein the system information comprises peripheral objects and ports installed on the remote system;

computer program code for determining software and options for installation on the remote system;

computer program code for stopping, by interacting with the remote system over the network, one or more related services on the remote system to allow replacement of existing component files of the peripheral software, at least in part in response to the user selection to install the peripheral software, said computer program code not requiring a subsequent reboot of the remote system;

computer program code for copying the peripheral software to the remote system over the network;

computer program code for restarting the one or more related services on the remote system by interacting with the remote system over the network; and computer program code for updating system information on the remote system by interacting with the remote system over the network.

6. The computer program product of claim 5 wherein the computer program code for resolving further comprises:

computer program code for attaching to a registry of the remote system to find a location on the remote system of the files and directions which are related to the peripheral software; and computer program code for enumerating the remote system to determine peripheral objects and ports on the remote system.

7. The computer program product of claim 6 wherein the computer program code for copying the peripheral software to the remote system over the network further comprises computer program code for copying a printer driver and one or more network utilities and wherein the computer program code for stopping and restarting the one or more related services includes computer program code for stopping and restarting a print spooler.

8. The computer program product of claim 5 wherein the computer program code for copying the peripheral software to the remote system over the network further comprises computer program code for copying a printer driver and one or more network utilities and wherein the computer program code for stopping and restarting the one or more related services includes computer program code for stopping and restarting a print spooler.

9. A programmed computer system including a central processing unit (CPU), memory, input/output connections, and a connection for a network, the programmed computer system also including a computer program for remotely installing peripheral software in response to a user selection to install the peripheral software on a remote system which is connected to the network, the computer program comprising:
 computer program code for resolving system information for the remote system by interacting with the remote system over the network, wherein the system information comprises peripheral objects and ports installed on the remote system;
 computer program code for determining software and options for installation on the remote system;
 computer program code for stopping, by interacting with the remote system over the network, one or more related services on the remote system to allow replacement of existing component files of the peripheral software, at least in part in response to the user selection to install the peripheral software, said computer code not requiring a subsequent reboot of the remote system;
 computer program code for copying the peripheral software to the remote system over the network;
 computer program code for restarting one or more related services on the remote system by interacting with the remote system over the network; and
 computer program code for updating system information on the remote system by interacting with the remote system over the network.

10. The programmed computer system of claim 9 wherein the computer program code for resolving further comprises:
 computer program code for attaching to a registry of the remote system to find a location on the remote system of files and directories which are related to the peripheral software; and
 computer program code for enumerating the remote system to determine peripheral objects and ports on the remote system.

11. The programmed computer system of claim 10 wherein the computer program code for copying the peripheral software to the remote system over the network further comprises computer program code for copying a printer driver and one or more network utilities and wherein the computer program code for stopping and restarting the one or more related services includes computer program code for stopping and restarting a print spooler.

12. The programmed computer system of claim 9 wherein the computer program code for copying the peripheral software to the remote system over the network further comprises computer program code for copying a printer driver and one or more network utilities and wherein the computer program code for stopping and restarting the one or more related services includes computer program code for stopping and restarting a print spooler.

13. Apparatus for connection to a network and for remotely installing peripheral software in response to a user selection to install the peripheral software on a remote computer system which is connected to the network, the apparatus comprising:
 means for resolving system information for the remote system by interacting with the remote system over the network, wherein the system information comprises peripheral objects and ports installed on the remote system;
 means for determining software and options for installation on the remote system;
 means for stopping, by interacting with the remote system over the network, any related service on the remote system to allow replacement of existing component files of the peripheral software, at least in part in response to the user selection to install the peripheral software, said means for stopping not including a requirement for a subsequent reboot of the remote system;
 means for copying the peripheral software to the remote system over the network;
 means for restarting any related service on the remote system by interacting with the remote system over the network; and
 means for updating system information on the remote system by interacting with the remote system over the network.

14. A software system for remotely installing peripheral software in response to a user selection to install the peripheral software on a remote system which is connected to a network, the software system comprising:
 an installation graphical user interface (GUI);
 an install engine connected to the installation GUI, the install engine for receiving a list of software from the installation GUI and for controlling the operation of the software system;
 a driver installation subsystem connected to the install engine for creating and customizing the peripheral software according to the list of software;
 a file copy subsystem for receiving a file copy list and displaying copy progress, the file copy subsystem connected to the install engine;
 an enumeration subsystem connected to the installation GUI for receiving system information from the remote system, the system information comprising drivers and ports installed on the remote system;
 a subsystem for starting and stopping one or more related services at least in part in response to the user selection to install the peripheral software, the subsystem for starting and stopping the one or more related services being connected to the file copy subsystem, said subsystem for starting and stopping not subsequently rebooting the remote system; and
 a remote system information subsystem for retrieving system information from the remote system, the remote system information subsystem connected to the system information subsystem and the file copy subsystem.

15. The software system of claim 14 wherein the subsystem for starting and stopping one or more related services further comprises means for starting and stopping a print spooler.

* * * * *